(12) United States Patent
Larson

(10) Patent No.: US 7,064,752 B1
(45) Date of Patent: Jun. 20, 2006

(54) MULTI-FUNCTION UNIT OF A GRAPHICS SYSTEM FOR UPDATING A HIERARCHICAL Z BUFFER

(75) Inventor: Ronald D. Larson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1133 days.

(21) Appl. No.: 09/172,389

(22) Filed: Oct. 14, 1998

(51) Int. Cl.
*G06T 15/00* (2006.01)

(52) U.S. Cl. .................. 345/419; 345/421; 345/422; 345/619; 345/620

(58) Field of Classification Search ............... 345/421, 345/422, 433, 434, 435, 427, 419, 619, 620, 345/629
See application file for complete search history.

(56) References Cited

U.S. PATENT DOCUMENTS 5,579,455 A * 11/1996 Greene et al. ............... 345/422
5,600,763 A * 2/1997 Greene et al. ............... 345/420
6,088,035 A * 7/2000 Sudarsky et al. ........... 345/421
6,646,639 B1 * 11/2003 Greene et al. ............... 345/422

OTHER PUBLICATIONS

Computer Graphics Proceedings, Annual Conference Series, 1993; Ned Green, et al.; Hierarchical Z-Buffer Visibility, pp. 231-238.

Computer Graphics Proceedings, Annual Conference Series, 1996; Ned Greene w/ Apple Computer; Hierarchical Polygon Tiling with Coverage Masks; pp. 65-74.

* cited by examiner

*Primary Examiner*—Kimbinh T. Nguyen

(57) ABSTRACT

A multi-function unit for occlusion testing primitives being processed in a graphics system and for updating a Z pyramid data structure used for occlusion testing. The Z pyramid data structure is updated on the fly, i.e., as primitives are being occlusion tested. The apparatus comprises multi-function unit is configured to create the Z pyramid data structure and to perform occlusion testing. The Z pyramid data structure comprises a plurality of levels, each of which comprises a plurality of regions. Each region comprises a plurality of subregions, each of which corresponds to a single Z value. Each region corresponds to a plurality of Z values and has a maximum region Z value, which corresponds to the largest Z value of the region. The multi-function unit compares the minimum Z value of each primitive with the maximum Z value of a region associated with the tested primitive to determine whether or not the tested primitive is fully occluded. Coverage masks are maintained by the multi-function unit for the different levels of the Z pyramid data structure to enable the Z pyramid data structure to be updated on the fly. When certain bits in the coverage masks are set, the multi-function unit causes the Z pyramid data structure to be updated.

18 Claims, 7 Drawing Sheets

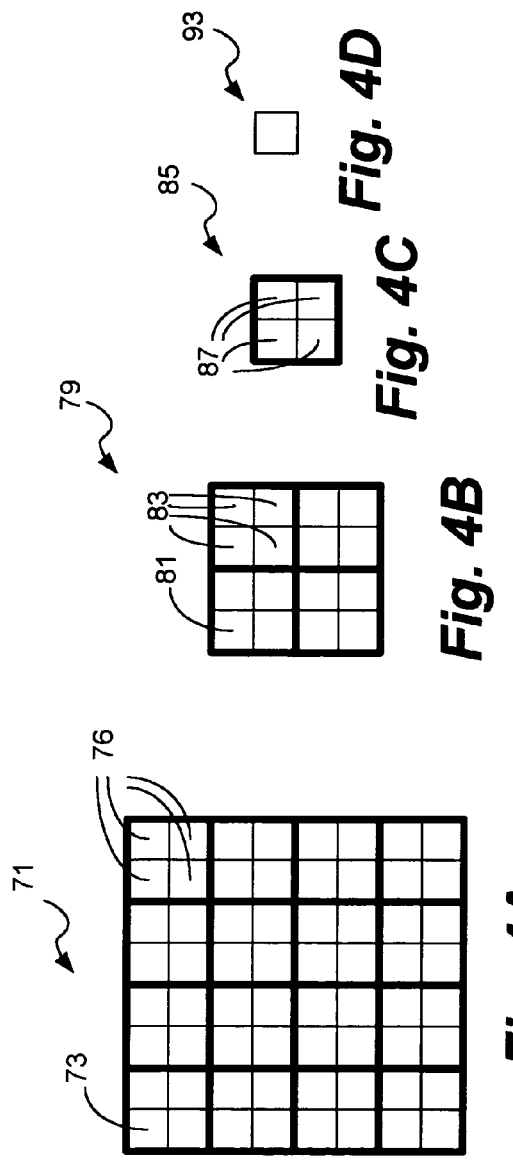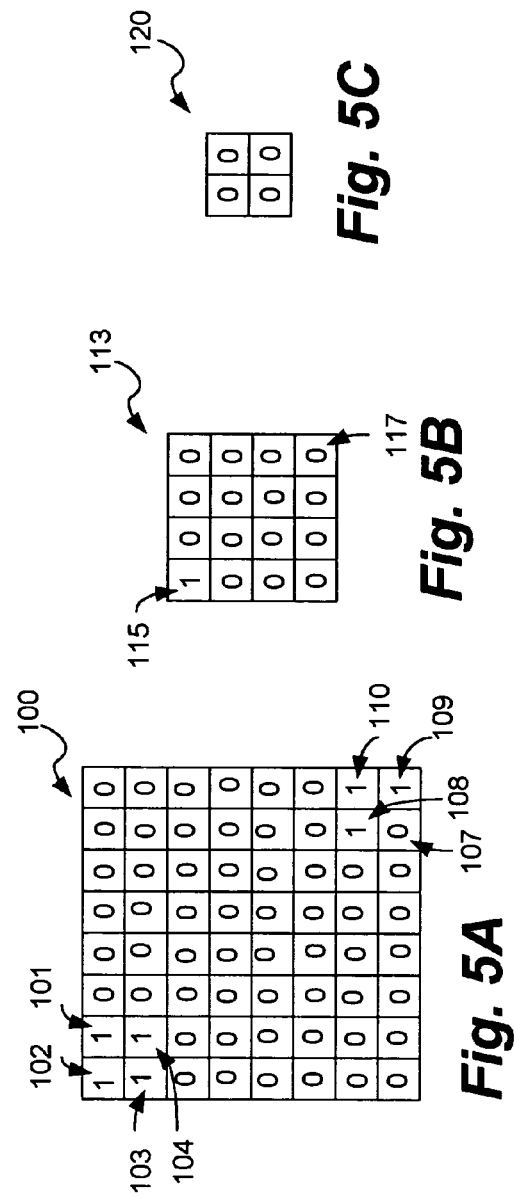

MULTI-FUNCTION UNIT OF A GRAPHICS SYSTEM FOR UPDATING A HIERARCHICAL Z BUFFER

TECHNICAL FIELD OF THE INVENTION

The present invention relates to a graphics system of a computer graphics display system and, more particularly, to a method and apparatus for updating a hierarchical Z buffer in a graphics system of a computer graphics display system.

BACKGROUND OF THE INVENTION

In 3-D graphics systems, primitives are defined by X, Y and Z coordinates of the primitive, by the normals of the vertices of the primitive, and by the colors of the vertices. A graphics system has been proposed that would utilize a Z pyramid memory element which stores the Z values for a current frame of pixels to test for primitive occlusion. Such a graphics system was proposed in an article entitled "Hierarchical Z-Buffer Visibility", SIGGRAPH 93, Anaheim, Calif., 1–6 Aug. 1993, by Greene, et al. This article discusses building a Z pyramid from the original Z buffer and using the Z pyramid to test cubes comprised of a plurality of primitives for occlusion culling. This approach makes use of the observation that the cube is hidden with respect to the Z buffer if all of its faces correspond to hidden polygons.

Prior to performing this comparison, the Z pyramid is constructed. The Z pyramid is constructed by starting with pixel-level Z values as the base of the pyramid and by comparing subgroups of adjacent Z values to determine the maximum Z value for each subgroup. The maximum Z value for that subgroup is then stored in the Z buffer for the next level up in the pyramid. For example, if 64 Z values were contained in the Z buffer when the comparison began, the next level up in the pyramid will contain 16 Z values, with each of the 16 Z values corresponding to the maximum Z value of the four pixels compared in the corresponding subgroup in the level below it.

In this next level up, the Z values of each subgroup of four adjacent Z values are compared to determine the maximum Z value for each subgroup and then this maximum Z value is stored in the Z buffer for the next level up in the pyramid. Therefore, for the next level up in the pyramid, the Z buffer will contain four Z values. These four Z values are then compared to determine the maximum Z value, which is stored in the Z buffer for the next level up in the pyramid. This last maximum Z value corresponds to the top of the pyramid.

Once the Z pyramid has been constructed, the Z values for the primitives making up the faces of the cubes are compared beginning at the highest level of the pyramid and working down towards the base of the pyramid. For each primitive, the minimum Z value of the primitive is tested against the levels of the pyramid in a top-to-bottom sequence. If the minimum Z value for the primitive is greater than the pyramid Z value, then the primitive is fully occluded. If all of the primitives making up the faces of the cube are occluded, the cube is occluded and can be discarded. If not, the process continues at each level of the pyramid until the cube is either fully occluded or until the process reaches the level in the Z pyramid at which a primitive is found to be at least partially visible.

Although this approach is capable of simultaneously testing a plurality of primitives instead of individually testing each primitive, this approach does not make any provision for updating the Z pyramid "on the fly". Once a determination is made that a cube contains a visible primitive, the visible primitive must be scan converted to the pixel level before the Z buffer can be updated and the Z pyramid can be reconstructed.

Accordingly, a need exists for a method and apparatus for updating the Z buffer and reconstructing the Z pyramid on the fly as primitives are processed through the graphics pipeline.

SUMMARY OF THE INVENTION

The present invention provides a multi-function unit for occlusion testing primitives being processed in a graphics system and for updating a Z pyramid data structure used for occlusion testing on the fly. The multi-function unit creates the Z pyramid data structure and performs occlusion testing. The Z pyramid data structure comprises a plurality of levels, each of which comprises a plurality of regions. Each region comprises a plurality of subregions, each of which corresponds to a single Z value. Each region corresponds to a plurality of Z values and has a maximum region Z value, which corresponds to the largest Z value of the region. The logic multi-function unit compares the minimum Z value of each primitive with the Z value of a region associated with the primitive to determine whether or not the primitive is fully occluded.

If a determination is made that the primitive is not fully occluded, the multi-function unit determines whether or not any subregion of the region associated with the primitive is fully covered by the primitive. If the multi-function unit determines that a subregion is fully covered by the primitive, then the multi-function unit determines whether or not the Z value of the covered subregion needs to be replaced with the maximum Z value of the tested primitive. In order for the multi-function unit to determine whether the Z value of the covered subregion needs to be replaced with the maximum Z value of the primitive, the multi-function unit determines whether or not the maximum Z value of the primitive is less than the Z value for the covered subregion.

If the multi-function unit determines that the maximum Z value of the primitive is less than the Z value for the covered subregion, then the Z value for the covered subregion is replaced with the maximum Z value of the primitive. Preferably, the multi-function unit maintains a coverage mask for each level of the Z pyramid data structure. Each coverage mask comprises a bit for each subregion of the level of the Z pyramid data structure associated with the coverage mask. When the multi-function unit determines that the maximum Z value of the primitive is less than the Z value for the covered subregion, a bit in the coverage mask associated with the covered subregion is set. When all of the coverage mask bits corresponding to the subregions of a particular region have been set, a bit is set for the corresponding region in the coverage mask associated with the next level up in the Z pyramid data structure.

When all of the bits in the coverage mask have been set for a particular region, the multi-function unit replaces the maximum Z value for the particular region with the maximum Z value of all of the subregions associated with the particular region. When all of the bits in the coverage mask have been set for a particular region in the coverage mask, the multi-function unit sets the corresponding bit in the coverage mask for the next level up in the Z pyramid.

Preferably, the primitives are occlusion tested in a tiler component of the graphics system and the Z pyramid data structure is updated by the tiler component on the fly as primitives are being processed through the graphics system.

The graphics system is comprised as part of a computer graphics display system. The Z pyramid data structure preferably is stored in a Z pyramid memory element, which is in communication with the tiler. Preferably, the Z pyramid memory element is periodically updated with pixel level Z values, i.e., with Z values of primitives which have been scan converted into screen coordinates corresponding to locations on the display monitor. In this way, the Z pyramid data structure can be updated on the fly and can be periodically updated with pixel level Z values to ensure accurate occlusion testing.

BRIEF DESCRIPTION OF THE DRAWINGS

FIGS. 4A–4D illustrate different levels of the Z pyramid used for occlusion testing by the macro-function unit shown in FIG. 3.

FIGS. 5A–5C correspond to coverage masks used for updating the Z pyramid levels illustrated in FIGS. 4A–4C.

DETAILED DESCRIPTION OF THE INVENTION

Figure 1:
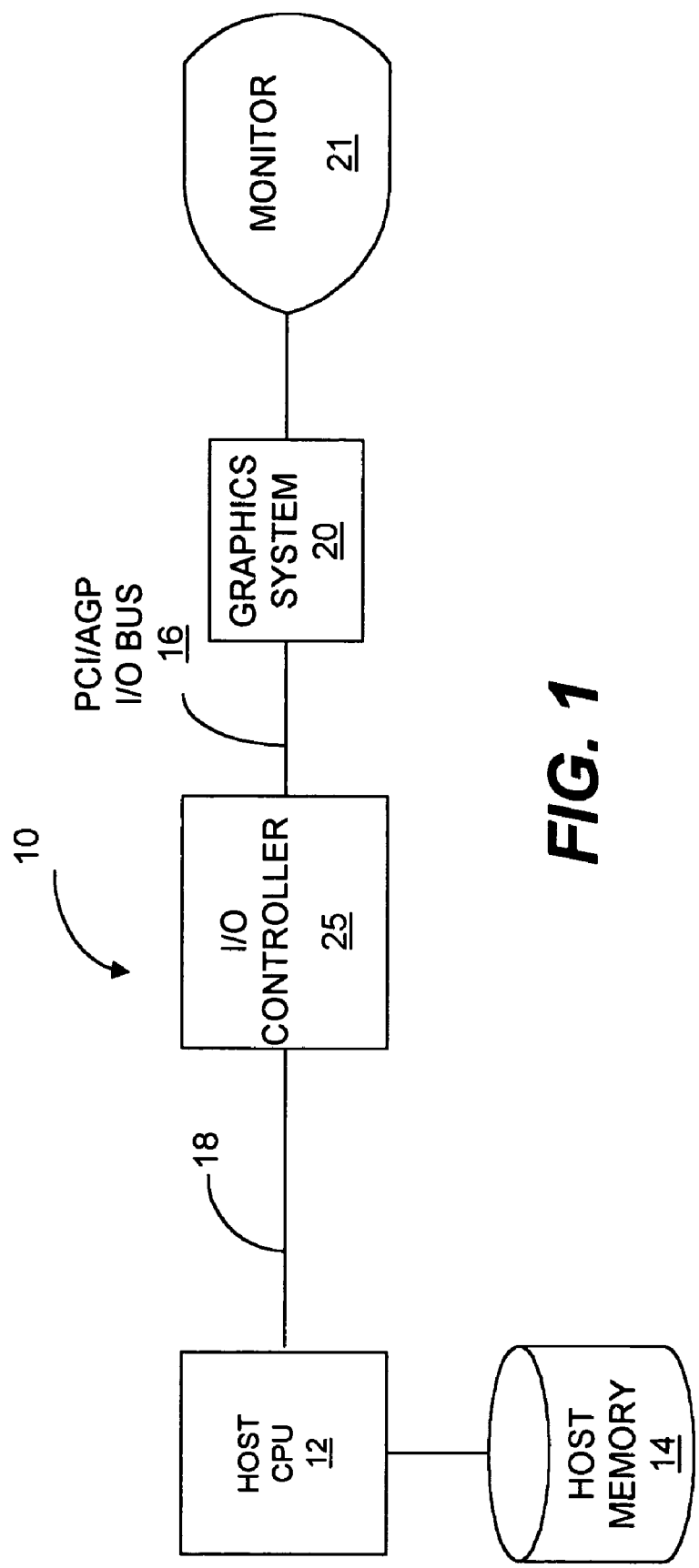
FIG. 1 is a block diagram of a computer graphics display system incorporating the graphics system of the present invention.

FIG. 1 is a block diagram of a computer graphics display system 10 comprising the graphics system 20 of the present invention in accordance with the preferred embodiment. The computer graphics display system 10 comprises a host CPU 12, a host memory device 14, a local bus 18, an input/output (I/O) controller device 25, an I/O bus 16, a graphics system 20, and a monitor 21 for displaying graphics information output from the graphics system 20.

The host CPU 12 processes input received from the console (not shown) of the computer graphics display system 10 and outputs commands and data over the local bus 18 to the I/O interface controller 25. The I/O interface controller 25 formats the commands and data utilizing the protocols of the I/O bus 16. The information received over the I/O bus 16 is input to the graphics system 20. The graphics system 20 then processes this information and causes graphics images to be displayed on the monitor 21.

Figure 2:
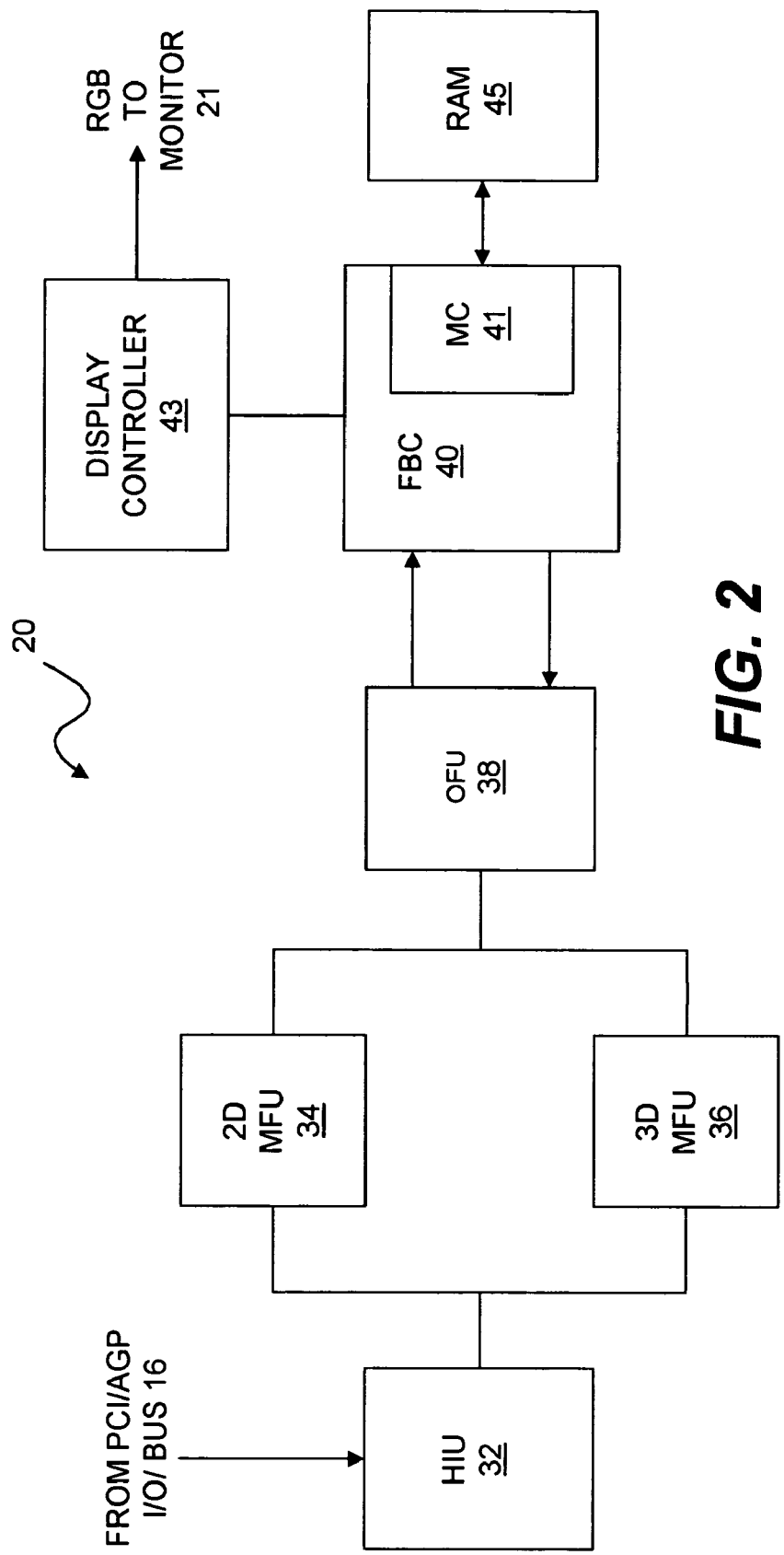
FIG. 2 is a block diagram of the graphics system of the computer graphics display system shown in FIG. 1.

FIG. 2 is a block diagram of the graphics system 20 of the present invention in accordance with the preferred embodiment. The host interface unit 32 fetches command data packets and texture maps from the host memory 14 via the I/O bus 16. The host interface unit 32 then provides graphics 2D information to the 2D macro-function unit (MFU) 34 and 3D information to the 3D macro-function unit (MFU) 36. The 2D macro-function unit 34 generates 2D vectors, text and rectangle spans. The 3D macro-function unit 36 performs triangle setup, 3D rastorization, and texture mapping, and pixel-level Z comparison operations, as discussed in more detail below with respect to FIG. 3. The 3D MFU 36 also performs occlusion testing in accordance with the present invention, as discussed in detail below with respect to FIGS. 3–7.

The output from the 2D and 3D macro-function units 34 and 36 is received by the object function unit (OFU) 38. The object function unit 38 performs rectangle clipping, patterning, frame buffer-to-frame buffer block transfers and rectangle span fills. The output of the object function unit 38 is received by the frame buffer controller (FBC) 40. The frame buffer controller 40 dispatches requests to the memory controller (MC) 41 to cause the memory controller 41 to write and read pixel colors and Z coordinates to and from RAM 45. The frame buffer controller 40 also fetches display information which is sent to the display controller 43. The display controller 43 receives the display information and converts it into red, green and blue (RGB) analog data and sends it to the display monitor 21.

Figure 3:
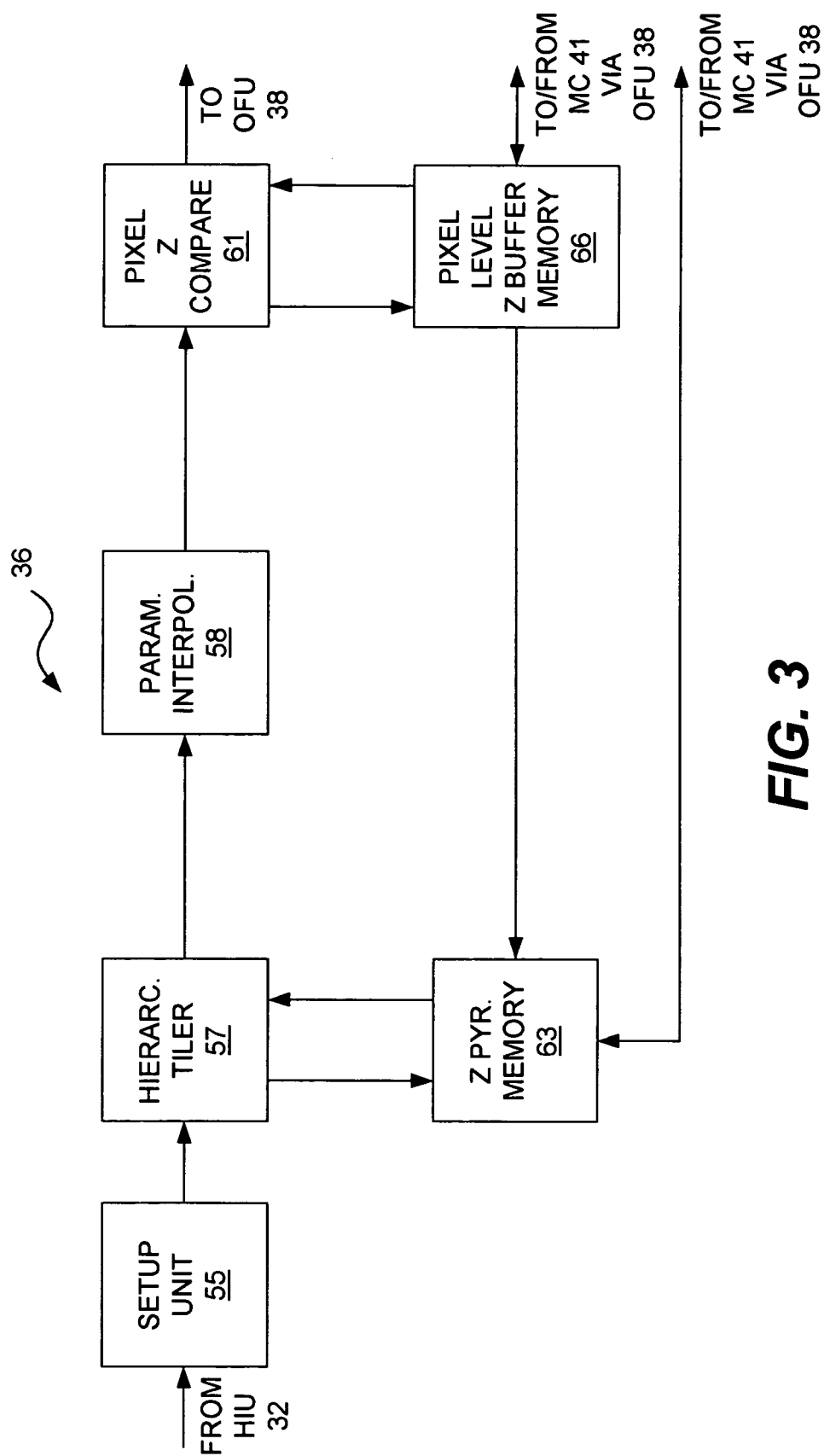
FIG. 3 is a block diagram of the macro-function unit of the graphics system shown in FIG. 2 in accordance with the preferred embodiment of the present invention.

FIG. 3 is a block diagram of the 3D macro-function unit 36 shown in FIG. 2. The setup unit 55 of the 3D macro-function unit 36 sets up edge equations for the polygons by using the X, Y values for the vertices of the polygons. The Z values of the vertices are used by the setup unit 55 to determine the minimum and maximum Z values for each polygon, as discussed below in detail with respect to FIGS. 4A–8. The minimum and maximum Z values for each polygon are then output to the hierarchical tiler 57. The hierarchical tiler 57 builds the Z pyramid on the fly, i.e., as the polygons are being processed through the graphics pipeline. The hierarchical tiler 57 performs occlusion testing using the minimum and maximum Z values for the polygons received from the setup unit 55. The hierarchical tiler 57 also generates and maintains the coverage masks in accordance with the present invention to update the Z pyramid, as discussed below in detail with respect to FIGS. 4A–8.

The hierarchical tiler 57 generates X and Y values corresponding to the minimum and maximum Z values for each of the visible primitives and provides the X and Y values to the parameter interpolator 58. The parameter interpolator 58 then calculates the exact Z values at the pixel level for each of the X and Y values received.

The exact Z values are then provided to the pixel Z-compare component 61. The pixel Z-compare component 61 then determines, at the pixel level, which values need to be written by the memory controller 41 of the frame buffer controller 40 to the Z buffer memory contained in RAM 45. In order to perform this pixel-level Z comparison test, the 3D macro-function unit 36 preferably comprises a pixel-level Z buffer memory 66 which stores the Z values obtained from the Z buffer memory comprised in RAM 45. The pixel Z compare component 61 uses these Z values to perform the pixel-level Z comparison tests.

Generally, the pixel-level Z comparison test compares batches of Z values stored in the frame buffer memory with the Z values generated by the parameter interpolator 58 to determine whether the Z values generated by the parameter interpolator 58 need to be stored in the Z buffer memory, or whether the pixel corresponding to the Z value is occluded. The pixel-level Z values to be stored in the Z buffer memory comprised in RAM 45 are then output to the object function unit 38 which then performs the tasks of rectangle clipping, patterning, frame buffer-to-frame buffer block transfers, rectangle span fills, etc.

FIGS. 4A–4D illustrate various levels of the Z pyramid date structure stored in Z pyramid memory element 63 and used for occlusion testing. FIG. 4A represents the base level of the Z pyramid and FIGS. 4B–4D represent successively higher levels of the pyramid, with FIG. 4D representing the top level of the pyramid. For ease of illustration and discussion, the base level of the Z pyramid is represented in FIG. 4A as containing 64 Z values 73 which are grouped into 16 subregions of adjacent Z values, each having four Z values. Each four adjacent Z values of each subregion 76 are compared to determine the maximum Z value for each subregion. The maximum Z values for each of the subregions are shown in FIG. 4B and represented by numeral 81. For this level of the pyramid 79, four subregions exist. Each subregion 83 in this level comprises four Z values. The four Z values for each of the four subregions 83 in level 79 are compared and the maximum Z values for each of the subregions 83 are saved. FIG. 4C represents the four maximum Z values resulting from the comparison of the Z values of the subregions 83 shown in FIG. 4B. The four Z values 87 of level 85 shown in FIG. 4C are then compared and the maximum Z value corresponds to the top level of the pyramid 93 shown in FIG. 4D.

In accordance with the present invention, coverage masks are used to indicate whether or not regions and/or subregions are covered by a polygon. These coverage masks are used to determine whether the Z pyramid needs to be updated and, if so, which Z values of the pyramid need to be updated. FIGS. 5A–5C illustrate the coverage masks associated with the different levels of the pyramid represented by FIGS. 4A–4C, respectively. These coverage masks enable the Z pyramid to be updated on the fly as polygons are being processed through the pipeline of the graphics system 20. The coverage mask for each level of the pyramid preferably comprises one bit for each Z value in the corresponding level of the pyramid. Each of these individual Z values correspond to a subregion within the level of the pyramid associated with the particular mask. For example, level 71 of the pyramid shown in FIG. 4A comprises 16 regions, each of which comprises 4 subregions. Therefore, the corresponding coverage mask shown in FIG. 5A comprises 64 entries, i.e., one bit per subregion.

For each level of the pyramid, a Z MAX. PYR. value is stored for each region, which corresponds to the maximum Z value for the region. This value is used for region-by-region occlusion testing. A Z value is also stored for each subregion. This value is only used for occlusion testing if occlusion testing has resulted in a prior determination that the polygon is not fully occluded and does not fully cover the region. However, the values for the individual subregions are used for updating the Z pyramid, as described in detail below with respect to FIG. 7.

If the minimum Z value for the polygon, Z MIN. POLY., is less than the Z value for the subregion and the polygon fully covers the region, then the Z value for the subregion is updated with the maximum Z value for the polygon, Z MAX. POLY. However, the Z value for the subregion is only updated if the Z MAX. POLY. value is less than the current Z value for the subregion, Z MAX. PYR. The corresponding bit for the subregion is then set in the coverage mask corresponding to that level of the pyramid. When all of the bits of a subregion are set, the corresponding region bit is set in the coverage mask associated with the next level up in the Z pyramid. For example, with respect to pyramid level 71 shown in FIG. 4A, if subregion 73 and the three subregions adjacent to it are all covered by a polygon, the corresponding bits at locations 101, 102, 103 and 104 in coverage mask 100 shown in FIG. 5A will be set. Consequently, the corresponding bit 115 in the coverage mask 113 for the next level up in the pyramid shown in FIG. 5B will also be set.

When some but not all of the bits for a region are set, as indicated by locations 107, 108, 109 and 110 in coverage mask 100 shown in FIG. 5A, the corresponding bit in the coverage mask for the next level up in the pyramid will not be set, as indicated in coverage mask 113 shown in FIG. 5B. Since only one of the bits in the coverage mask 113 shown in FIG. 5B are set, none of the bits in the coverage mask 120 shown in FIG. 5C are set.

When all of the bits in the coverage mask associated with a region are set, the Z values for all of the subregions of the region are compared to find the maximum value. This maximum Z value becomes the Z MAX. PYR. value for that region and is used to perform occlusion testing.

Figure 6:
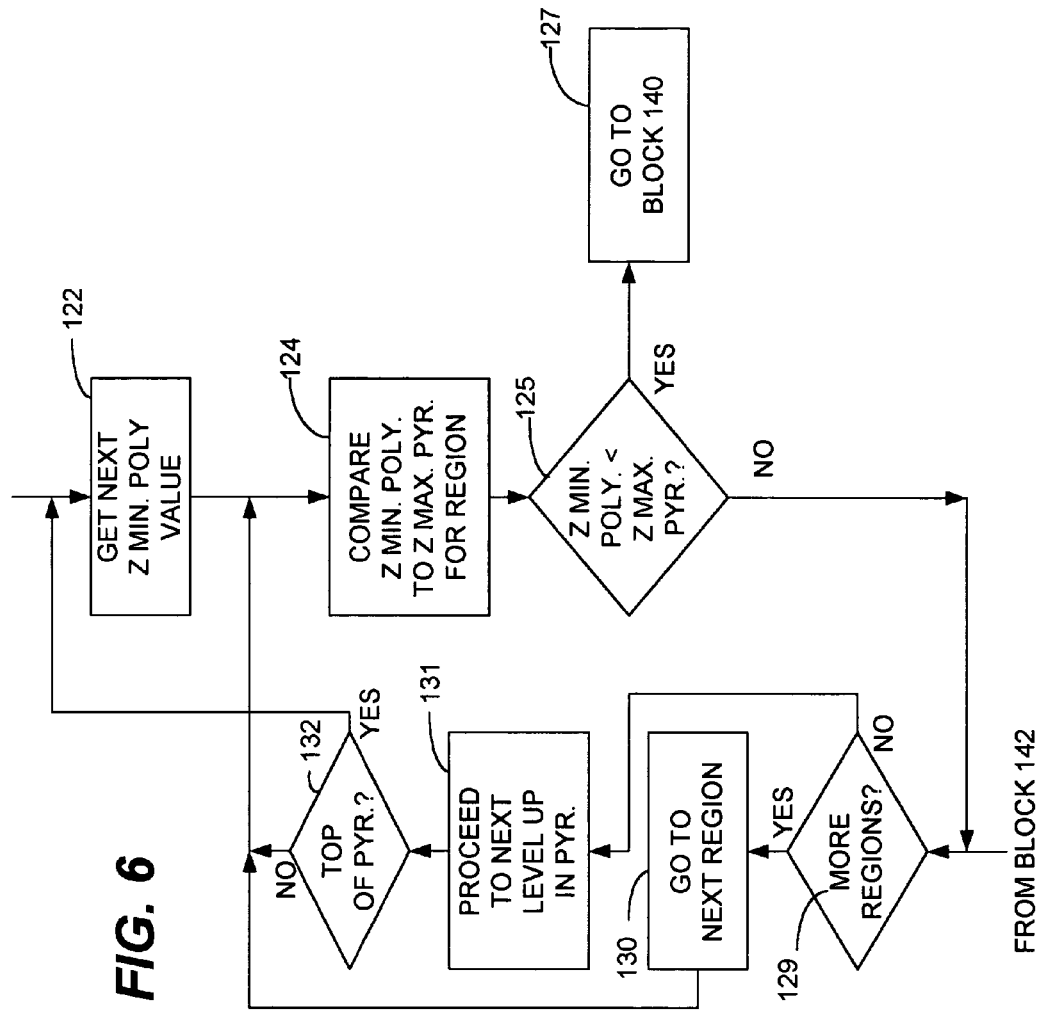
FIGS. 6–8 are flow charts illustrating the method of the present invention for performing occlusion testing and for updating the Z pyramid on the fly.
Figure 7:
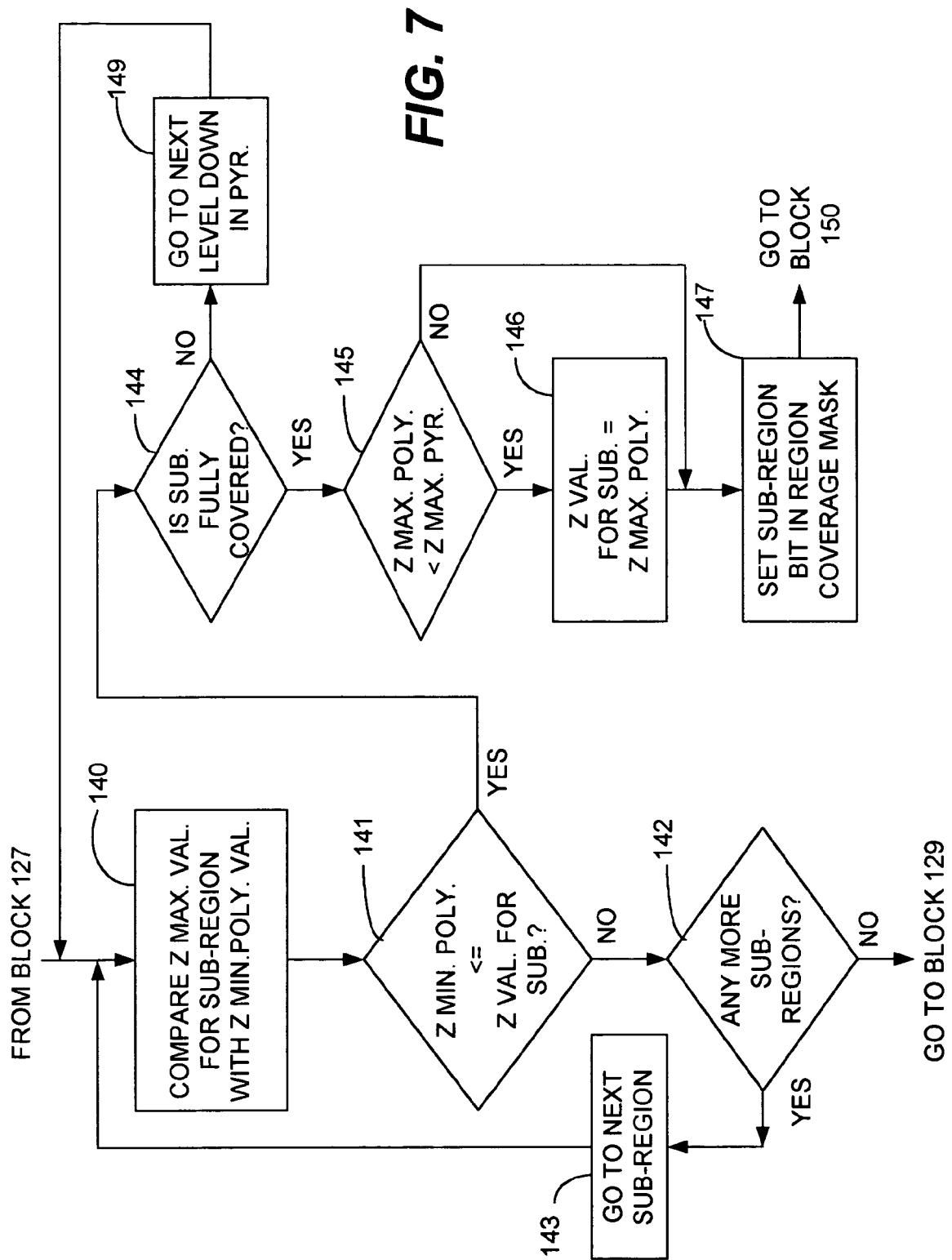

The method by which the Z pyramid represented by FIGS. 4A–4D is used to perform occlusion testing will now be discussed with respect to the flow charts of FIGS. 6–8. In accordance with the preferred embodiment of the present invention, the polygons are occlusion tested on a region-by-region basis by comparing the minimum Z value of each polygon against the maximum Z value for each region in the current level of the pyramid. A subregion-by-subregion comparison preferably is only performed if the region is not fully occluded by the polygon and if the region is not fully covered by the polygon.

Assuming that the Z pyramid has already been constructed, the first block of the occlusion testing is to obtain the minimum Z value, Z MIN. POLY. for the polygon being occlusion tested, as indicated by block 122. The Z MIN. POLY. value is then compared to the Z MAX. PYR. value for the regions of the current level of the pyramid that intersect with the polygon, as indicated by block 124. Starting with the top level of the pyramid, a determination is made as to whether the Z MIN. POLY. value is less than the Z MAX. PYR. value, as indicated by block 125. If so, the polygon is at least partially visible, and the process proceeds to block 140 in FIG. 7, as indicated by block 127, for occlusion testing on a subregion-by-subregion basis, as described below in detail.

If a determination is made at block 125 that the Z MIN. POLY. value is not less than the Z MAX. PYR. value, the process proceeds to block 129 and a determination is then made as to whether there are anymore regions at the current level of the pyramid to be tested, as indicated by block 129.

When a determination is made at block 125 that the Z MIN. POLY. value is less than the Z MAX. PYR. value for the region, which means that the polygon being tested is at least partially visible, the process proceeds to block 140 in FIG. 7. The Z value for each subregion is then compared with the Z MIN. POLY. value to determine whether or not the polygon is occluded by the subregions. If a determination is made at block 141 that the Z MIN. POLY. value is not less than or equal to the Z value for the subregion, a determination is made at block 142 as to whether there are any more subregions to be compared within the region. If not, the process returns to block 129 in FIG. 6. If, at block 142, a determination is made that there are more subregions within the region to be compared, the process proceeds to the next subregion within the region, as indicated by block 143. The Z value for the next subregion is then compared with the Z MIN. POLY. value, as indicated by block 140.

If a determination is made at block 141 that the Z MIN. POLY. value is less than or equal to the Z value for the subregion being compared, the process proceeds to block 144 where a determination is made as to whether the subregion is fully covered by the polygon. If so, a determination is then made as to whether the maximum Z value for the polygon being tested, Z MAX. POLY., is less than the Z MAX. PYR. value for the subregion, as indicated at block 145. If it is, the Z MAX. PYR. value for the subregion is assigned the value of the maximum Z value for the polygon, Z MAX. POLY., as indicated at block 146. The corresponding bit for the subregion is then set in the region coverage mask, as indicated at block 147, and then the process proceeds to block 150 in FIG. 7, as discussed below in detail, to determine whether the Z pyramid needs to be reconstructed with the updated Z buffer values.

If a determination is made at block 144 that the polygon does not fully cover the subregion, the process proceeds to the next level down in the pyramid, as indicated by block 149, and then returns to block 140 so that the polygon can be tested against the subregions in this level of the pyramid.

Figure 8:
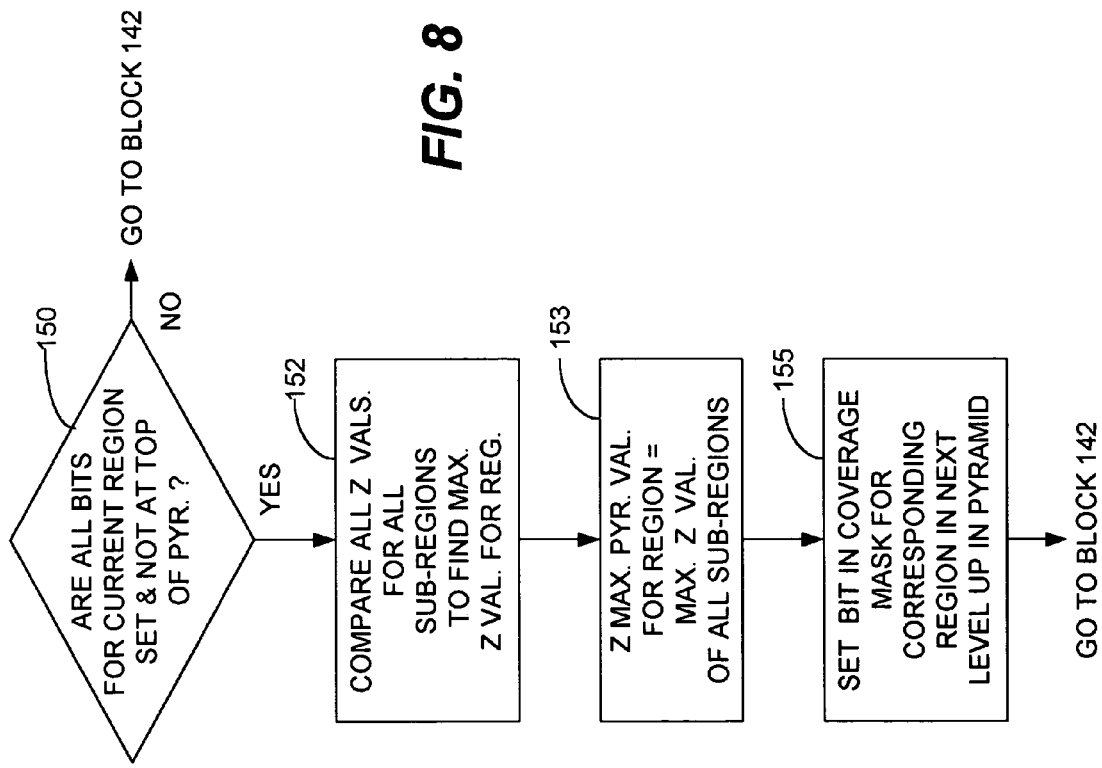

When the process proceeds to block 150 in FIG. 8, a determination is made as to whether or not the bits for all of the subregions of the current region have been set in the coverage mask. If not, the process returns to block 142 in FIG. 7 where a determination is made as to whether there are any more subregions to be tested against the polygon.

If a determination is made at block 150 that all bits corresponding to the region have been set in the coverage mask, and that the process is not at the top level of the pyramid, the maximum Z value for the region, Z MAX. PYR., is then assigned a value equal to the maximum Z value of all of the subregions, as indicated by block 153. This new value is then used in the block 125 in FIG. 6 to perform occlusion testing of the polygons on a region-by-region basis. The bit in the coverage mask corresponding to the region is then set in the coverage mask for the next level up in the pyramid, as indicated by block 155. The process then returns to block 142 in FIG. 7. The process also returns to block 142 when a determination is made at block 150 that either all bits for the current region are not set or that the process has reached the top level of the pyramid.

Whenever a coverage mask associated with a particular level of the Z pyramid is updated, a determination must be made as to whether the coverage masks associated with the higher levels in the pyramid must also be updated. For example, when the bits for all of the subregions associated with a region have been set in a coverage mask, the coverage mask associated with the next level up in the pyramid will need to be set. The process then proceeds to the next level up in the pyramid and a determination is then made as to whether the coverage mask associated with that level up in the pyramid needs to be set. This process continues until either the top level of the pyramid is reached or a determination is made that the corresponding bits in the coverage mask do not need to be set. When less than all of the bits for the subregions associated with a region have been set in a coverage mask, the coverage mask associated with the next level up in the pyramid will not need to be set. By updating the coverage masks in this manner, the Z pyramid is updated on the fly as the polygons are being processed through the graphics system 20.

Since the Z pyramid is updated on the fly using the minimum and maximum Z values for the polygons, the Z pyramid preferably is periodically rebuilt using pixel-level Z values provided from the pixel-level Z buffer memory element 66 to the Z pyramid memory element 63. This ensures the accuracy of the Z values used for occlusion testing and of the pixel-level Z values output from the MFU 36 to the OFU 38.

It should be noted that the present invention has been described with reference to the preferred embodiments of the present invention and that the present invention is not limited to these embodiments. Those skilled in the art will understand that modifications may be made to the embodiments discussed above without deviating from the spirit and scope of the present invention.

What is claimed is:

1. A multi-function unit of a graphics system, comprising:
a hierarchical tiler configured to occlusion test primitives, the primitives comprising a maximum Z value and a minimum Z value, the maximum and minimum Z values associated with respective X-Y coordinate values, the hierarchical tiler further configured to create a Z pyramid data structure as polygons defined by a plurality of primitives are processed by the multi-function unit;
a parameter interpolator coupled to the hierarchical tiler configured to receive the X-Y coordinate values from the hierarchical tiler and generate a Z value at the pixel level for each received X-Y coordinate value;
a pixel-level comparator coupled to the parameter interpolator configured to determine at a pixel level which values need to be written by a frame buffer controller; and
a memory unit coupled to the hierarchical tiler and the pixel-level comparator, the memory unit configured to store a change in the Z pyramid data structure responsive to an occlusion test result for a visible primitive before the pixel-level comparator determines whether pixel level values for the visible primitive need to be written by the frame buffer controller.

2. The multi-function unit of claim 1, wherein the Z pyramid data structure is periodically updated in accordance with pixel level values from a Z buffer responsive to the frame buffer controller.

3. The multi-function unit of claim 1, wherein the pixel level comparison is performed responsive to pixel level values from a Z buffer responsive to the frame buffer controller.

4. The multi-function unit of claim 1, further comprising:
an object function unit coupled to the pixel level comparator and the Z buffer configured to perform at least one function selected from clipping, patterning, transferring, and filling.

5. The multi-function unit of claim 1, wherein the hierarchical tiler maintains coverage masks to update the Z pyramid data structure.

6. The multi-function unit of claim 5, wherein the Z pyramid data structure comprises a plurality of levels, each level comprising a plurality of regions, each region comprising a plurality of subregions, each subregion comprising a Z value.

7. The multi-function unit of claim 6, wherein the hierarchical tiler compares the minimum Z value of each primitive with the Z value of a region to determine if the primitive is occluded.

8. The multi-function unit of claim 7, wherein in response to a determination that the visible primitive is not fully occluded, the hierarchical tiler determines whether any subregion of the region is fully covered by the primitive.

9. The multi-function unit of claim 8, wherein when a present subregion is covered, the hierarchical tiler determines whether the Z value of the covered subregion is to be replaced with the maximum Z value of the visible primitive.

10. The multi-function unit of claim 1, wherein the hierarchical tiler maintains a coverage mask for each level of the Z pyramid data structure.

11. The multi-function unit of claim 10, wherein when the hierarchical tiler determines that the maximum Z value of the visible primitive is less than the Z value for a covered subregion, a bit in the coverage mask associated with the covered subregion is set.

12. The multi-function unit of claim 11, wherein in response to a determination that all the coverage mask bits corresponding to the subregions of a particular region have been set in the coverage mask associated with a first level of the Z pyramid structure, a bit is set for the corresponding region in the coverage mask associated with a next level up in the Z pyramid data structure.

13. The multi-function unit of claim 12, wherein in response to a determination that all the bits in the coverage mask have been set for a particular region in the coverage mask, the hierarchical tiler replaces the maximum Z value for the particular region with the maximum Z value of all the subregions associated with the particular region.

14. The multi-function unit of claim 13, wherein in response to a determination that all the bits in the coverage mask have been set for a particular region in the coverage mask, the hierarchical tiler sets the corresponding bit in the coverage mask for a next level up in the Z pyramid data structure.

15. The multi-function unit of claim 1, wherein the hierarchical tiler maintains, for the Z pyramid data structure, coverage masks that are separate from the Z pyramid data structure and that indicate which Z values in the Z pyramid data structure need to be updated.

16. The multi-function unit of claim 15, wherein the hierarchical tiler is configured to adjust the coverage mask associated with a particular level of the Z pyramid structure in response to a determination by the hierarchical tiler that the maximum Z value of the visible primitive is less than the Z value for a covered subregion at the particular level of the Z pyramid structure.

17. A method for use in a graphics system, comprising:
defining a Z pyramid data structure, the Z pyramid data structure comprising a maximum Z value for a group of pixels defining a region, the region having a plurality of subregions including a first subregion, the Z pyramid data structure having a Z value for the first subregion;

comparing a minimum Z value of a primitive to the Z pyramid data structure;

determining whether the primitive is occluded based on the comparing;

scan converting the primitive to a pixel level if the primitive is determined to be not fully occluded in the determining;

updating the Z pyramid based on the primitive prior to the scan converting, the updating comprising changing the Z value for the first subregion to the maximum Z value of the primitive if the first subregion is fully covered by the primitive and if the maximum Z value of the primitive is less than the Z value for the first subregion;

maintaining a coverage mask indicating whether Z values of the Z pyramid data structure for each of the subregions have been updated;

updating the coverage mask in response to the changing; and updating the maximum Z value for the group of pixels in response to a determination that the coverage mask indicates that each of the Z values for each of the subregions has been updated.

18. The method of claim 17, wherein the coverage mask has bits respectively corresponding with each of the subregions and wherein the updating the coverage mask comprises setting the bit of the coverage mask corresponding to the first subregion.

* * * * *

UNITED STATES PATENT AND TRADEMARK OFFICE
CERTIFICATE OF CORRECTION

| | |
|---|---|
| PATENT NO. | : 7,064,752 B1 |
| APPLICATION NO. | : 09/172389 |
| DATED | : June 20, 2006 |
| INVENTOR(S) | : Ronald D. Larson |

Page 1 of 1

It is certified that error appears in the above-identified patent and that said Letters Patent is hereby corrected as shown below:

In column 3, line 62, delete "rastorization" and insert -- rasterization --, therefor.

In column 8, line 35, in Claim 4, delete "pixel level" and insert -- pixel-level --, therefor.

Signed and Sealed this

Fourteenth Day of July, 2009

JOHN DOLL
*Acting Director of the United States Patent and Trademark Office*